(12) United States Patent
Holbein

(10) Patent No.: US 10,427,641 B2
(45) Date of Patent: Oct. 1, 2019

(54) BELT RETRACTOR HAVING A SIGNAL TRANSMITTER RING

(71) Applicant: TRW Automotive GmbH, Alfdorf (DE)

(72) Inventor: Wolfgang Holbein, Alfdorf (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 179 days.

(21) Appl. No.: 15/531,524

(22) PCT Filed: Dec. 4, 2015

(86) PCT No.: PCT/EP2015/002448
§ 371 (c)(1),
(2) Date: May 30, 2017

(87) PCT Pub. No.: WO2016/091370
PCT Pub. Date: Jun. 16, 2016

(65) Prior Publication Data
US 2018/0334133 A1    Nov. 22, 2018

(30) Foreign Application Priority Data

Dec. 11, 2014   (DE) .................... 10 2014 018 262

(51) Int. Cl.
*B60R 22/46* (2006.01)
*B60R 22/48* (2006.01)
(Continued)

(52) U.S. Cl.
CPC ........ *B60R 22/46* (2013.01); *B60R 21/01548* (2014.10); *B60R 22/48* (2013.01); *G01D 5/145* (2013.01); *B60R 2022/4825* (2013.01)

(58) Field of Classification Search
CPC ...... B60R 21/01548; B60R 2022/4825; B60R 22/34; B60R 22/46; B60R 22/48; G01D 5/145
(Continued)

(56) References Cited

U.S. PATENT DOCUMENTS 6,290,160 B1 * 9/2001 Strobel ................ B60R 22/34
180/268
7,242,183 B2 * 7/2007 Recio .................... G01D 5/145
324/207.2

(Continued)

FOREIGN PATENT DOCUMENTS

GB       1390017 A  *  4/1975  ............ B60R 22/48
JP  2007326513 A  * 12/2007  ............ B60R 22/48
(Continued)

*Primary Examiner* — Ruth Ilan
(74) *Attorney, Agent, or Firm* — Tarolli, Sundheim, Covell & Tummino LLP

(57) ABSTRACT

The invention relates to a belt retractor comprising a signal transmitter ring (6) for a magnetic sensor (34), comprising a hub (14) which is connected to the belt reel in a rotationally fixed manner and comprising a signal transmitter portion (20) exhibiting periodically varying material properties when viewed in the circumferential direction, wherein the signal transmitter portion includes a stop (30) by which it abuts against a contact surface (32) associated therewith, and comprising a spring portion (18) acting on the signal transmitter portion relative to the hub so that the stop abuts against the contact surface.

11 Claims, 2 Drawing Sheets

(51) Int. Cl.
*G01D 5/14* (2006.01)
*B60R 21/015* (2006.01)

(58) Field of Classification Search
USPC ........................................ 280/807; 324/207.2
See application file for complete search history.

(56) References Cited

U.S. PATENT DOCUMENTS

| | | | | |
|---|---|---|---|---|
| 8,046,136 | B2 * | 10/2011 | Odate | ..................... B60R 22/44 |
| | | | | 180/268 |
| 8,960,585 | B2 * | 2/2015 | Ikeda | ..................... B60R 22/44 |
| | | | | 242/390.8 |
| 2008/0105777 | A1 | 5/2008 | Holbein et al. | |
| 2009/0048739 | A1 * | 2/2009 | Midorikawa | ........... B60R 22/44 |
| | | | | 701/45 |
| 2011/0278905 | A1 * | 11/2011 | Ikeda | ..................... B60R 22/34 |
| | | | | 297/475 |
| 2015/0130449 | A1 | 5/2015 | Hans | |
| 2015/0300479 | A1 * | 10/2015 | Frank | ................... F16H 57/021 |
| | | | | 324/207.2 |

FOREIGN PATENT DOCUMENTS

| | | | | |
|---|---|---|---|---|
| JP | 2012136046 A | * | 7/2012 | |
| WO | WO-2009060667 A1 | * | 5/2009 | ............. B60R 22/34 |

\* cited by examiner

BELT RETRACTOR HAVING A SIGNAL TRANSMITTER RING

RELATED APPLICATIONS

This application corresponds to PCT/EP2015/002448, filed Dec. 4, 2015, which claims the benefit of German Application No. 10 2014 018 262.2, filed Dec. 11, 2014, the subject matter of which are incorporated herein by reference in their entirety.

BACKGROUND OF THE INVENTION

The invention relates to a belt retractor comprising a belt reel, a housing part and a signal transmitter ring.

Hereinafter the invention shall be described in the context of belt retractors incorporated in vehicles. Said belt retractors may require to sense the movement of rotation of a belt reel, which is frequently carried out by means of magnetic sensors. A signal transmitter ring according to the invention may also be used in any other applications, however, in which a movement of rotation of a shaft is to be sensed.

In particular applications, especially when the belt retractor includes a reversible tensioning unit, it may be necessary, however, to directly sense the movement of rotation of the reel, for example in order to be able to detect accelerations, rotational speeds or tensioning paths during tensioning. Such sensing is frequently performed by a magnetic disk which co-rotates with the shaft and rotation of which is detected by means of a magnetic sensor arranged on the housing.

In known belt retractors, axial tolerances regarding the position of the retractor shaft of the belt reel cannot be avoided. However, such tolerances are critical to the magnetic sensor, as the latter is intended to reliably provide a measuring signal in all tolerance situations. In this way, very strong (and thus expensive) magnets have to be used which reliably permit positioning even in the case of maximum distance from the sensor.

SUMMARY OF THE INVENTION

Therefore, it is the object of the present invention to provide a belt retractor comprising a signal transmitter ring by which high sensing quality of the signals of the signal transmitter ring can be achieved in an economically advantageous manner.

This object is achieved, according to the invention, by a belt retractor comprising a signal transmitter ring for a magnetic sensor, comprising a hub connected to the belt reel in a rotationally fixed manner and comprising a signal transmitter portion exhibiting periodically varying material properties when viewed in the circumferential direction, wherein the signal transmitter portion has a stop by which it abuts against a contact surface associated therewith, and comprising a spring portion which acts on the signal transmitter portion relative to the hub such that the stop abuts against the contact surface, and wherein the magnetic sensor is disposed to be axially opposed to the signal transmitter portion.

The idea underlying the invention is to fix the axial position of the signal transmitter ring independently of the axial tolerance of the shaft. This is achieved in that, in the assembled state of the magnetic sensor, the spring portion forces the signal transmitter portion with its stop against a contact surface on the housing of the belt retractor, for example, where also the sensor is disposed. Thus, there is no axial positional tolerance between the sensor and the signal transmitter portion, as the spring portion absorbs the axial tolerances. Consequently, magnets which are suited for the respective distance between the signal transmitter portion end the sensor may be employed.

Acting on the signal transmitter portion relative to the hub by the spring portion has to be understood especially to the effect that, when mounting the signal transmitter ring, the latter is axially driven with its hub to a final mounting position of the shaft until the stop starts to abut against the contact surface and consequently the spring portion compresses. At least in the final mounting position the hub is connected to be axially fixed to the shaft or rests on a shaft stop of the shaft counteracting the spring force of the spring portion.

According to a development, the periodically varying material properties of the signal transmitter portion are obtained by plural magnets disposed along the circumference of the signal transmitter portion, for example permanent magnets, thus enabling contactless sensing of a movement of rotation of the shaft without the signal transmitter ring having to be separately supplied with energy, in the normal case the magnets are equally spaced apart from each other.

According to a further development, the periodically varying material properties of the signal transmitter portion are obtained by plural metallic elements disposed to be spaced apart from each other along the circumference of the signal transmitter portion, which enables a cheaper design of the signal transmitter ring, in particular because the metallic elements may be cheaper than magnets.

In order to be able to detect the metallic elements upon rotation of the signal transmitter ring relative to the magnetic sensor, on the magnetic sensor, especially on the side thereof facing away from the signal transmitter ring, a magnet the field of which is varied by the passed-by metallic elements may be disposed, which can be detected by means of the magnetic sensor.

Preferably, the magnets and, resp., the metallic elements are exposed on the side of the stop so as to enable undisturbed detection of the varying material properties, especially in the case of rotation, and/or simple and quick assembly. In addition, the magnets may be arranged, when being exposed on one side, at a minimum distance from the sensor.

According to a development, the spring portion of the signal transmitter ring includes plural, especially two, three or a plurality of spring arms, which enables the signal transmitter ring to be configured at low weight. Said spring arms can extend purely radially or radially and axially, for example, so as to connect the hub and the signal transmitter portion to each other at an as short distance as possible and thus to allow for further weight optimization.

According to a development the spring arms extend at least also in the circumferential direction, however, thus facilitating adjustment of the spring characteristics of the spring arms to a predetermined spring force and/or to a predetermined maximum spring travel, especially due to the larger possible length of the spring arms. For example, a spring arm is attached to the hub and from said shoulder extends in the circumferential direction to a shoulder at the signal transmitter portion which in the circumferential direction may be disposed approximately at the position of the shoulder of the next spring arm on the hub.

According to a development, the signal transmitter portion is a ring closed in the circumferential direction, thus causing reliable fixing of ail signal transmitters, especially magnets and metallic elements, resp., to be obtained in a plane extending perpendicularly to the axis of rotation of the shaft.

According to a development, the hub is provided with at least one rotary drive structure, which may ensure reliable fixing of the hub to the shaft in the direction of rotation. In addition, especially on an axial side of the hub facing the stop, a hub stop may be provided on the shaft so as to axially fix the hub to the shaft at least so that the spring force of the spring portion introduced to the stop may be supported.

According to an alternative development, the hub includes an inner diameter entering into press-fit with an outer diameter of the shaft at an axial mounting position, said press-fit being configured so that the hub is axially and rotationally fixed to the shaft when the signal transmitter ring is operated.

According to a development, the spring portion is formed of plastic material integrally with other portions of the signal transmitter ring, especially with the signal transmitter portion and/or the hub. This allows for simple and/or cost-efficient manufacture and mounting of the signal transmitter ring.

Advantageously, a housing part of the belt retractor serves as contact surface for the stop of the signal transmitter portion.

BRIEF DESCRIPTION OF THE DRAWINGS

Preferred further developments are the subject matter of the subclaims; exemplary configurations of the invention are shown in the Figures and the pertaining descriptions of figures—at least partially schematized—wherein in detail:

DESCRIPTION

Figure 1:
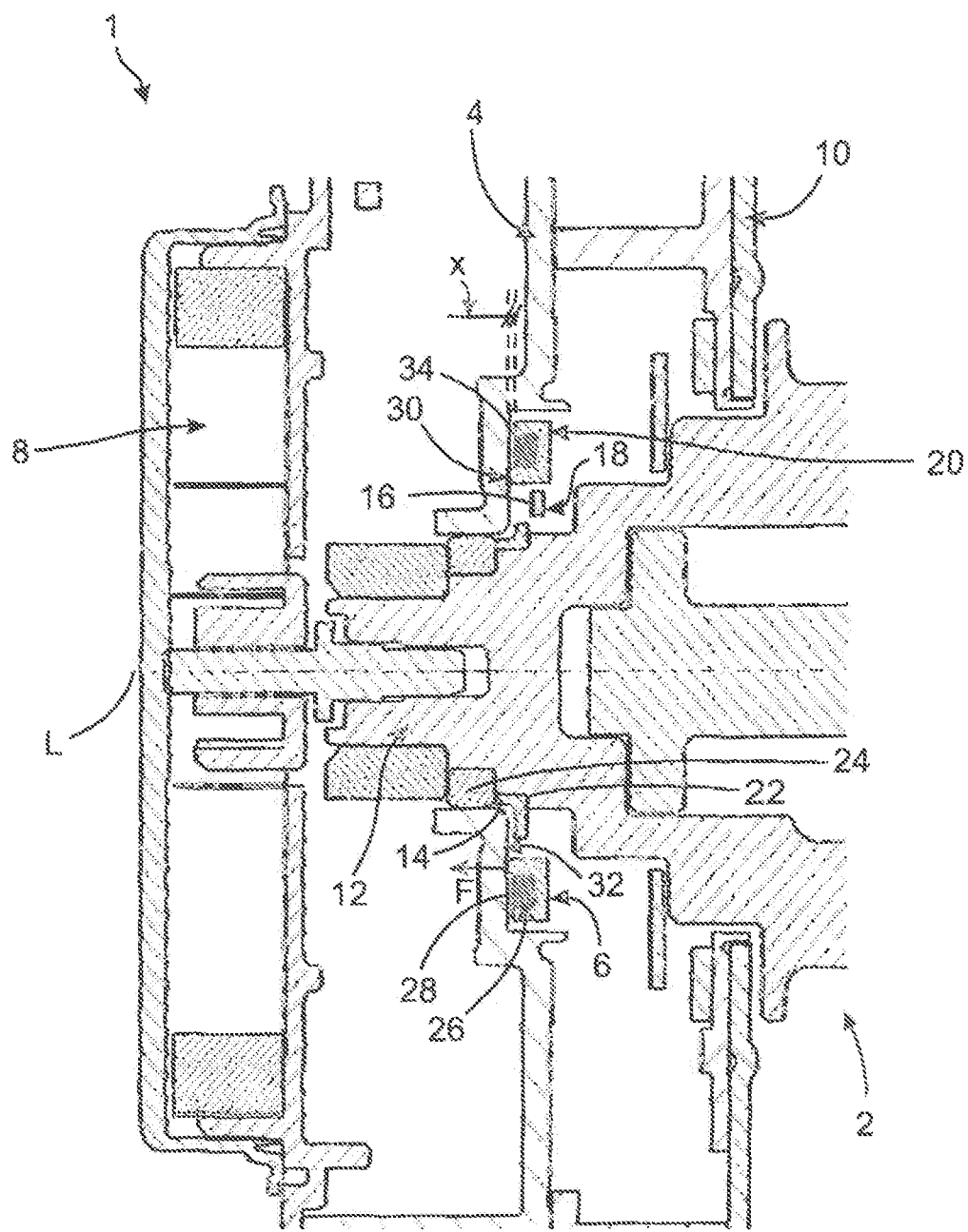
FIG. 1 in a sectional view shows a cutout of a belt retractor comprising a signal transmitter ring according to a configuration of the invention.

In FIG. 1 an axial end of a belt retractor 1 is shown having a belt reel 2, a housing part 4 and a signal transmitter ring 6. The housing part 4 in this example is part of the gearbox housing of a tensioning unit of the belt retractor 1 to which a spring cassette 8 is joined and is connected to a frame 10 of the belt retractor 1 in a rotationally fixed manner. The belt reel 2 is connected to be rotationally fixed to a shaft 12 on which a hub 14 of the signal transmitter ring 6 is disposed in a rotationally fixed manner.

The hub 14 of the signal transmitter ring 6 is integrally connected to A spring portion 18 including three spring arms 16 and a signal transmitter portion 20. The spring portion 18 is arranged in the radial direction with respect to a longitudinal axis L of the belt reel 2 and of the shaft 12 between the hub 14 and the signal transmitter portion 20.

The hub 14 is axially fixed on the shaft 12 substantially by a shaft stop 22 and a shaft bearing 24 by means of which the shaft 12 is supported on the housing part 4.

The signal transmitter portion 20 includes a recess extending in the circumferential direction in which a plurality of signal transmitters 26 are accommodated to be equally spaced along the circumference, wherein the signal transmitters may be magnets 28 or ferromagnetic, non-permanently magnetic metallic elements.

The signal transmitter portion 20 in addition includes a stop 30 which in this embodiment extends along the entire circumference of the signal transmitter portion in the type of a ring and which abuts against a contact surface 32 of the housing part 4. However, the stop may as well be configured so that it abuts only along at least part of the circumference or substantially only locally against the contact surface.

The signal transmitters 26 are arranged at an axial distance X from a magnetic sensor 34 in the form of a Hall sensor which in the embodiment is arranged to be flush with the contact surface 32 in the housing part 4. The axial distance X corresponds to a projection of the stop 30 from the signal transmitters 26 arranged in the seat of the signal transmitter portion 20.

The magnetic sensor 34 is arranged at a peripheral position in the housing part 4 at a radial position which at least substantially corresponds to the radial position of the signal transmitters 28, i.e. opposite thereto. Unless the signal transmitters 26 are designed as permanently magnetic metallic elements, the magnetic sensor 34 includes a permanent magnet on its side facing away from the signal transmitters.

Hereinafter the functioning of the belt retractor 1 illustrated in FIG. 1 and especially of the signal transmitter ring 6 employed in the former shall be explained in detail. In a belt retractor 1 according to the shown embodiment the signal transmitters 26 are always arranged at the predetermined axial distance X from the magnetic sensor 34, independently of a variable axial position of the shaft 12 which is not fixed very accurately. Said substantially constant axial position of the signal transmitters 26 is achieved by the fact that the stop 30 abuts against the contact surface 32 independently of the axial position of the shaft 12. For this purpose, the signal transmitter ring 6 is under resilient bias F which is applied by the spring portion 13. Said bias or spring force F ensures the stop 30 to reliably abut against the contact surface 32.

The bias of the signal transmitter ring 8 and the resulting contact of the stop 30 with the contact surface 32 is due to the geometry of the signal transmitter ring 6 and the positioning of the signal transmitter ring 6 during mounting of the belt retractor 1. In a first mounting step, the signal transmitter ring 6 is applied to the shaft 12 until it abuts against the shaft stop 22. After that, the shaft bearing 24 is applied to the shaft 12 until the hub 14 of the signal transmitter ring 6 is substantially axially fixed in this way. In the representation of FIG. 1, the shaft 12 is inserted from the right into the housing of the belt retractor until it has reached an axial final mounting position. Said final mounting position is within the axial tolerance range of the shaft 12 during operation of the belt retractor 1 end is selected so that the stop 30 of the signal transmitter ring 6 abuts against the contact surface 32 of the housing part 4 already before the axial tolerance range is reached. With the shaft 12 being subsequently further introduced, now the spring portion 18 of the signal transmitter ring 6 is elastically deformed, thus causing a gradually increasing spring force to be available at the stop 30 of the signal transmitter portion 20 so as to ensure reliable abutment against the contact surface 32.

When, during operation of the belt retractor 1, the belt reel 2 and thus the shaft 12 are rotating, also the signal transmitter ring 6 and thus the signal transmitter ring 6 including the signal transmitters 28 rotates at a constant distance from the magnetic sensor 34. This allows for constant and consequently reliable signal transmission to the magnetic sensor 34, which transmission works even with weak magnets 28 as the axial distance x may also be selected to be very small.

Figure 2:
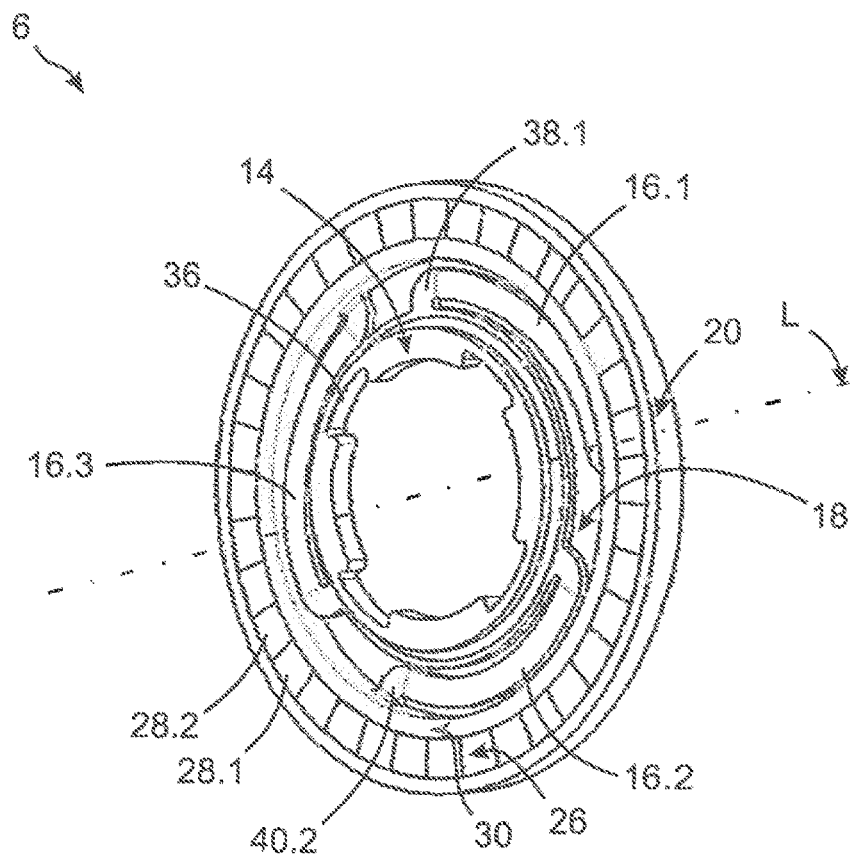
FIG. 2 in a perspective front view shows a signal transmitter ring according to a configuration of the invention.

From FIG. 2 especially the structure of a signal transmitter ring 8 according to a configuration of the invention is evident. The hub 14 is formed to have rotary driving structures 38 for attaching to a corresponding groove-and-tongue structure of the shaft 12. The spring portion 18 formed integrally with the hub 14 includes three spring arms 16, each being connected to the hub 14 by means of a hub shoulder 38 and to the signal transmitter portion 20 by means of a signal transmitter portion shoulder 40. Between the shoulders 38 and 40 each of the spring arms 16 extends in the circumferential direction of the signal transmitter ring. In the embodiment shown here each of the three spring arms 16 adopts almost one third of the entire circumference so that the spring arms are arranged to be spread substantially over the entire circumference and equally spaced from each other.

In the recess of the signal transmitter portion 20 a plurality of signal transmitters 26 are arranged to be equally spaced from each other, each of the signal transmitters 26 being in the form of a magnet 28. Each magnet 28 has an inherent magnetic field which at its edges is formed other than in its center. This results in material properties periodically varying over the circumference. In this case a periodically varying magnetic field which can be detected by means of the magnetic sensor 34 and can be converted to a rotational speed when taking a time factor into account.

The design of the spring arms 16 as a flat plastic land bent in the circumferential direction allows compression along the longitudinal axis L of the shaft 12 on which the signal transmitter ring 8 is supported.

Due to the perspective representation, in FIG. 2 the projection of the stop 30 from the visible end plane of the magnets 28 cannot be perceived very clearly, but it amounts to at least 1 millimeter so that a corresponding axial distance x between the magnets 28 and the magnetic sensor 34 can be observed. In terms of function, also smaller distances are possible if rubbing is prevented by the constructional design.

Figure 3:
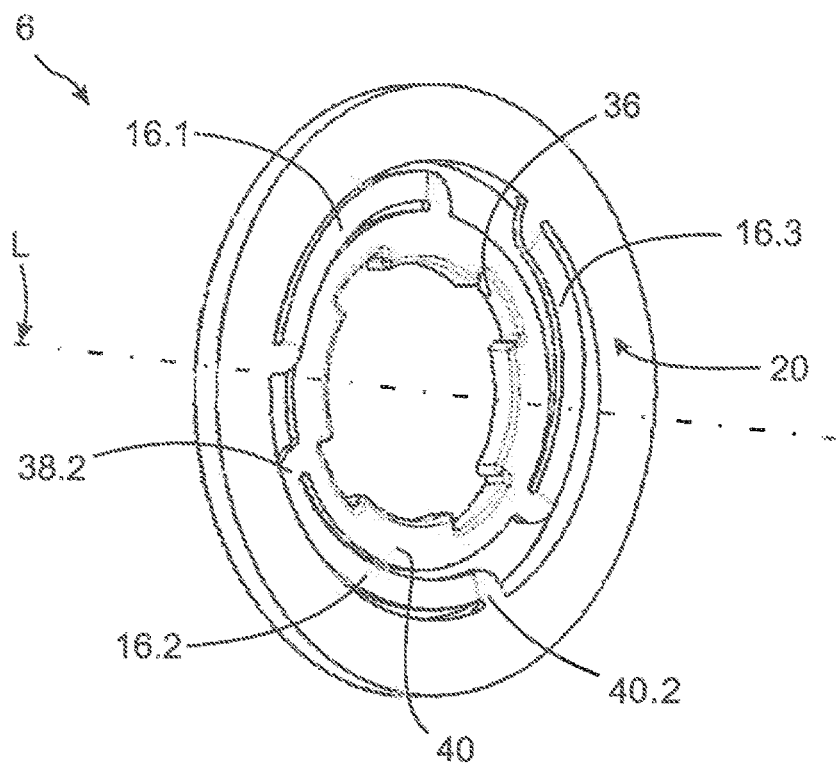
FIG. 3 in a perspective rear view shows the signal transmitter ring of FIG. 2.

FIG. 3 illustrates the rear side of the signal transmitter ring 6 of FIG. 2, wherein especially the extension of the spring portion 18 configured to have three spring arms 16 is evident, in addition, it is visible that in this embodiment the signal transmitter portion 20 is in the form of a ring closed in the circumferential direction.

The invention claimed is:

1. A belt retractor (1) comprising a belt reel (2), a housing part (4) and a signal transmitter ring (6) for a magnetic sensor (34), comprising a hub (14) which is connected to the belt reel in a rotationally fixed manner, a signal transmitter portion (20) having periodically varying material properties when viewed in the circumferential direction, wherein the signal transmitter portion (20) includes a stop (30) by which it abuts against a contact surface (32) associated therewith, and comprising a spring portion (18) integrally formed with the signal transmitter ring (6) which acts on the signal transmitter portion (20) relative to the hub (14) so that the stop (30) abuts against the contact surface (32), and wherein the magnetic sensor (34) is arranged to be axially opposed to the signal transmitter portion (20).

2. The belt retractor (1) according to claim 1, wherein the periodically varying material properties are obtained by plural magnets (28) disposed along the circumference of the signal transmitter portion.

3. The belt retractor (1) according to claim 2, wherein the magnets are exposed on a side of the stop facing the contact surface.

4. The belt retractor (1) according to claim 1, wherein the periodically varying material properties are obtained by plural metallic elements disposed to be spaced apart from each other along the circumference of the signal transmitter portion.

5. The belt retractor (1) according to claim 4, wherein the metallic elements are exposed on a side of the stop facing the contact surface (32).

6. A belt retractor (1) comprising a belt reel (2), a housing part (4) and a signal transmitter ring (6) for a magnetic sensor (34), comprising a hub (14) which is connected to the belt reel in a rotationally fixed manner, a signal transmitter portion (20) having periodically varying material properties when viewed in the circumferential direction, wherein the signal transmitter portion (20) includes a stop (30) by which it abuts against a contact surface (32) associated therewith, and comprising a spring portion (18) having plural spring arms (16) that act on the signal transmitter portion (20) relative to the hub (14) so that the stop (30) abuts against the contact surface (32), and wherein the magnetic sensor (34) is arranged to be axially opposed to the signal transmitter portion (20).

7. The belt retractor (1) according to claim 6, wherein the spring arms extend in the circumferential direction.

8. The belt retractor (1) according to claim 1, wherein the signal transmitter portion is a ring closed in the circumferential direction.

9. The belt retractor (1) according to claim 1, wherein the hub is provided with at least one rotary driving structure (36).

10. The belt retractor (1) according to claim 1, wherein the spring portion is formed of plastic material integrally with the signal transmitter ring.

11. The belt retractor (1) according to claim 1, wherein the housing part serves as a contact surface (32) for the stop (30) of the signal transmitter portion (20).

* * * * *